United States Patent
Bryson et al.

(10) Patent No.: US 8,416,964 B2
(45) Date of Patent: Apr. 9, 2013

(54) VEHICULAR AUTOMATIC GAIN CONTROL (AGC) MICROPHONE SYSTEM AND METHOD FOR POST PROCESSING OPTIMIZATION OF A MICROPHONE SIGNAL

(75) Inventors: Michael A. Bryson, Hudsonville, MI (US); Robert R. Turnbull, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 699 days.

(21) Appl. No.: 12/570,615

(22) Filed: Sep. 30, 2009

(65) Prior Publication Data

US 2010/0150374 A1    Jun. 17, 2010

Related U.S. Application Data

(60) Provisional application No. 61/122,548, filed on Dec. 15, 2008.

(51) Int. Cl.
*H04B 15/00* (2006.01)

(52) U.S. Cl. ............... 381/94.1; 381/94.2; 381/94.3; 704/205; 704/225

(58) Field of Classification Search .......... 704/205–210, 704/225–230, 270, 233; 381/92, 94.1–94.3, 381/94.7, 98, 122, 313, 317
See application file for complete search history.

(56) References Cited

U.S. PATENT DOCUMENTS

| | | | | |
|---|---|---|---|---|
| 5,396,560 | A | * | 3/1995 | Arcos et al. .................... 381/320 |
| 5,550,925 | A | * | 8/1996 | Hori et al. ......................... 381/98 |
| 5,832,097 | A | * | 11/1998 | Armstrong et al. ............ 381/321 |
| 6,088,670 | A | * | 7/2000 | Takada ............................. 704/233 |
| 6,859,540 | B1 | * | 2/2005 | Takenaka ...................... 381/94.3 |
| 8,112,283 | B2 | * | 2/2012 | Ise ................................ 704/270.1 |
| 2002/0165718 | A1 | * | 11/2002 | Graumann et al. ............ 704/270 |
| 2003/0033139 | A1 | * | 2/2003 | Walker ........................... 704/210 |
| 2010/0177908 | A1 | | 7/2010 | Seltzer et al. |

OTHER PUBLICATIONS

Michael L. Seltzer and Ivan Tashev, A Log-MMSE Adaptive Beamformer Using a Nonlinear Spatial Filter, Speech Technology Group, Microsoft Research, Redmond, WA 98052, {mseltzer, ivantash} @microsoft.com, Sep. 2008, 4 pages.

* cited by examiner

*Primary Examiner* — Vivian Chin
*Assistant Examiner* — Friedrich W Fahnert
(74) *Attorney, Agent, or Firm* — Price Heneveld LLP; Scott P. Ryan (57) ABSTRACT

A method for processing signals for reducing noise components in a vehicular microphone system (500A) compares (517) a plurality of noise component values (511, 513, 515) for at least one frequency band of plurality of frequency bands. At least one frequency band is then downwardly expanded (521) by a predetermined expansion ratio (523) for providing a noise reduced signal (535) when determining a value is below a predetermined threshold (519).

26 Claims, 6 Drawing Sheets

VEHICULAR AUTOMATIC GAIN CONTROL (AGC) MICROPHONE SYSTEM AND METHOD FOR POST PROCESSING OPTIMIZATION OF A MICROPHONE SIGNAL

CROSS-REFERENCE TO RELATED APPLICATIONS

This application is related to U.S. Provisional Application Ser. No. 61/122,548, filed on Dec. 15, 2008, entitled "A Vehicular Microphone System and Method for Post Processing Optimization of a Microphone Signal" and assigned to Gentex Corporation who claims priority under 35 U.S.C. §120.

FIELD OF THE INVENTION

The present invention pertains to microphones and more particularly to a microphone arrangement associated with a vehicle accessory.

BACKGROUND

Microphones used in automotive electronic applications, such as cell phones, navigational systems, and vehicular control, are well-known in the art. An automotive vehicle presents challenges to the use of a microphone in view of the numerous sources of noise that can interfere with vocalized speech inside the vehicle. These challenges can be particularly difficult when adapting a microphone solution for use in the vehicular rearview mirror assembly. In addition to the difficulties of rejecting noise within the vehicle, disturbances to the sound field caused by the rearview mirror must also be addressed.

The prior art includes systems that use microphones positioned in tandem, i.e., a first microphone positioned in front of a second microphone. This type of system works to produce a difference signal for canceling noise by subtracting the signals and using a delay to account for the distance between the microphones. However, the rearview mirror disturbs the sound field between the two microphones, which results in poor subtraction over much of the frequency range of interest. Additionally, this front and back microphone configuration requires the rearview mirror to include a deeper housing for supporting the rearward microphone, which is often an undesired design feature in view of styling, weight, vibration sensitivity, and molding required in the manufacturing process.

Other prior art systems use microphones positioned in parallel that use digital processing or simple delay networks to improve operation. The use of digital processing introduces delay and variation over time that disrupts systems designed for a single microphone. Therefore, this type of simple delay based processing does not yield the desired performance Additionally, many of the microphone systems currently in use were developed under the assumption that the microphone would be used in connection with a handheld cellular phone. In a handheld applications, the very close proximity of the user's mouth to the microphone assures a very high speech-to-noise content for most situations. These systems do not function correctly with microphones used at a distance because audio received at increased distances does not exhibit the same frequency characteristics.

Microphones distant from an audio source that are used in a hands-free car system, unlike a very close use situation, will often have a very significant noise content, and manifest a wider dynamic range. A "close use" situation or microphone may be defined as one positioned within 20 cm of the audio source such as a user's mouth. The dynamic range is increased because of the broader range of possible speech signal levels and relative noise content. In a distant use situation, if a wider dynamic range speech signal is processed via the phone system, especially phones employing code division multiple access (CDMA), much of the desired speech can be lost because the processing system is unable to correctly determine that speech is present. Thus, the phone system functions as if a voice signal is comprised of only noise.

The current state of the art seeks to lower the noise content while retaining the speech in its unaltered state. This process does not restore the nature of the speech signal to that of a close use microphone as found in a typical handset and as a result does not yield a signal able to pass through the cell phone's CODEC. As a result, there will be many frequency bands or occurrences where the speech content, though significant, is not great enough to overcome the residual noise to the extent so as to avoid being interpreted as noise. Thus, in latter processing stages, these frequency bands or occurrences will be removed because they appear to be only unwanted noise. Even though the speech content is significant, it is not of a great enough magnitude to overcome the noise in certain frequency bands or at certain times.

Moreover, most cars driven above 50 mph, on rough roads, will have less than acceptable speech quality through the cellular phone when using a BLUETOOTH connected hands-free microphone system because of limited dynamic range. These problems are magnified where the cellular phone is a CDMA type because the CODECs employed in these phones are less tolerant of a wide dynamic range signal. The CODEC system, in attempting to limit band width, stops correctly transmitting the speech signal because it interprets it as being unwanted noise. In some cases, the speech components in the cellular call can be totally lost. The loss can be such that the user may feel they have suffered a classic cellular phone drop out when, in fact, the call is still in progress and connected. Since there are literally millions of cellular phones with CODECs implementing a bandwidth/noise reduction algorithm that will truncate speech as described, the only hope for a solution is a process that will result in a signal whose speech content will be passed even when noise is also present.

There are three aspects that can address incorrect CODEC operation: processing of the microphone signal to emulate the signal from a close used microphone, reduction of the noise proportion in a way that does not otherwise harm system operation and an elevation of all significant content speech frequency bands to a magnitude well above all other bands. In every case the threshold where an action is invoked can be variable based on a number of factors including the average noise level, peak noise levels, least noise level, average speech levels, least speech level and peak speech levels. The intent being to process the speech carrying signal to minimize the impact of any noise present in the vehicle. This processing ideally needs to be adjusted to align with the conditions when a microphone is in use.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention. These figures address one aspect of the three groups involved, the use of two transducers to reduce the noise content in the speech signal. The other two concepts are defined via textual descriptions and can be used in conjunction with the dual microphone processing or exclusively in various combinations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

These and other features, advantages, and objects of the present invention will be further understood and appreciated by those skilled in the art by reference to the following specification, claims, and appended drawings.

DETAILED DESCRIPTION

Before describing in detail embodiments that are in accordance with the present invention, it should be observed that the embodiments reside primarily in combinations of method steps and apparatus components related to post processing optimization of a microphone signal containing residual noise. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of post processing optimization of a microphone signal containing residual noise. The non-processor circuits may include, but are not limited to, signal amplifiers, clock circuits, power source circuits, compressors, expanders, noise gates, and user input devices. Those skilled in the art will recognize that compressors, expanders and/or noise gates can be implemented in several ways, including the use of voltage controlled amplifiers. As such, these functions may be interpreted as steps of a method to perform post processing optimization of a microphone signal containing residual noise and/or excessive dynamic range. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Figure 1:
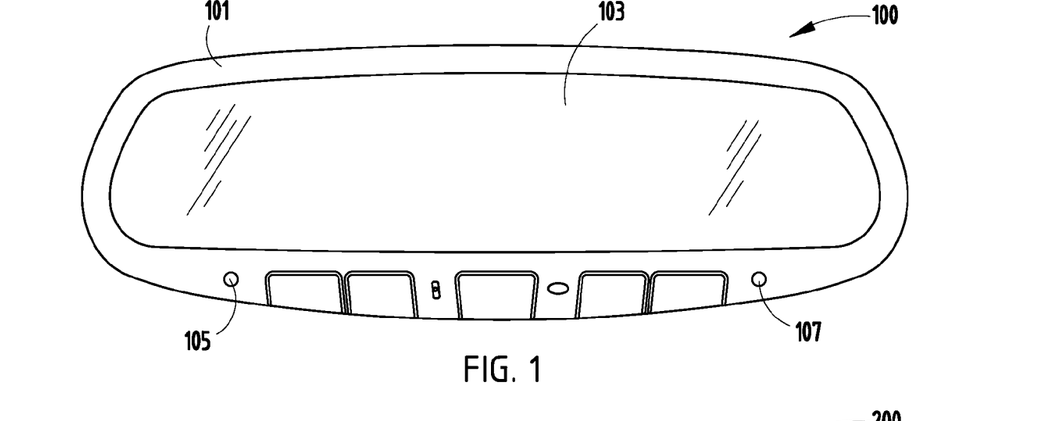
FIG. 1 is a perspective view of a rearview mirror assembly using a vehicular microphone system in accordance with an embodiment of the invention.

FIG. 1 is a perspective view of a rearview mirror assembly using a vehicular microphone system in accordance with an embodiment of the invention. The rearview microphone assembly 100 includes a housing 101 that is supported within the interior of the vehicle. A mirror 103 is used by the driver to view objects from his rear. A first transducer 105 and second transducer 107 are positioned within the housing 101 and are used to capture voice from inside a vehicle.

Figure 2:
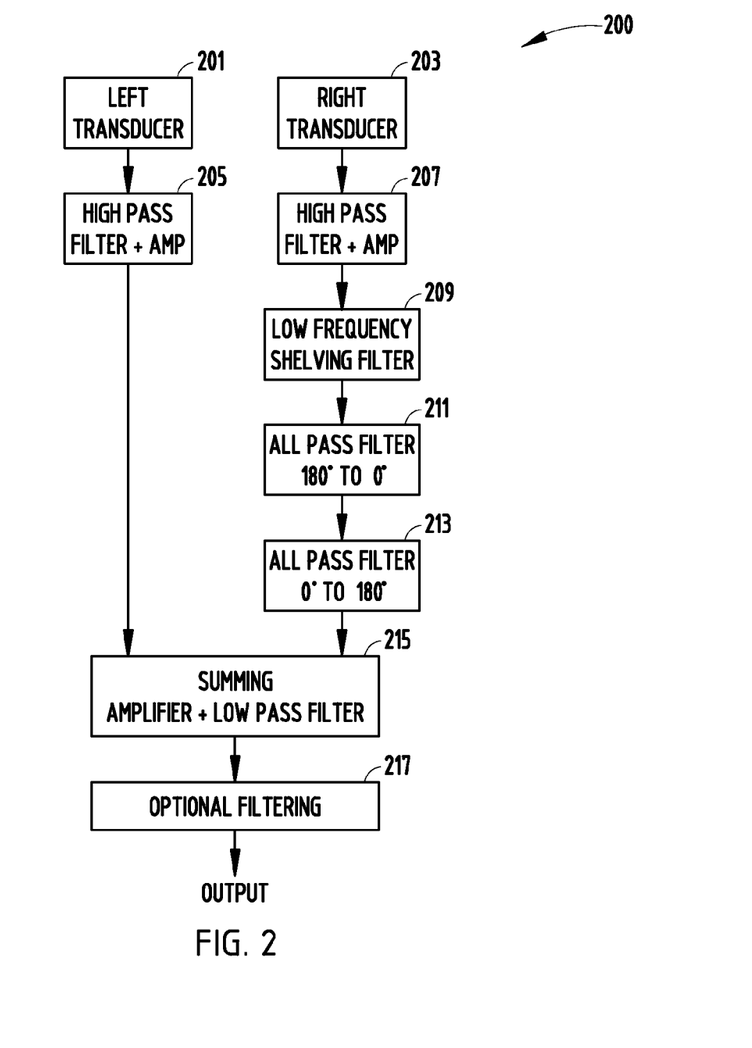
FIG. 2 is block diagram of a two-microphone array in accordance with an embodiment of the invention.

FIG. 2 is block diagram of a two-microphone array 200 using a first and second channel in accordance with an embodiment of the invention. A first transducer 201 and second transducer 203 are used in the array and separated by some predetermined distance. The first transducer 201 and second transducer 203 are audio microphones or the like. The first transducer 201 is connected to a first high pass filtering network 205, while the second transducer 203 is connected to a second high pass filter network 207. Both the first high pass filtering network 205 and second high pass filtering network 207 include both filtering and amplification circuitry for tailoring the audio signal in a predetermined fashion. Both filter and amplifier circuits need not be identical, however, and may, in fact, filter and/or amplify signals from their respective transducers in a unique manner with differing filter cut-off frequencies and characteristics.

In the second channel, the high pass filter network 207 is fed to a low frequency shelving filter 209 that works to reduce the low frequency signal before entering the summer The shelving filter allows one or more parameters of the audio signal from the high pass filter network 207 to be adjusted for determining the overall shape of the filter's transfer function. The shelving filter ultimately improves the fidelity of sound, to emphasize certain voice characteristics by sacrificing some low frequency directionality. The output of the low frequency shelving filter 209 is then directed to a first all pass filter 211. The all pass filter 211 is an electronic filter that passes all frequencies equally, but changes the phase relationship between various frequencies. It does this by varying its propagation delay with frequency. Generally, the all pass filter 211 can be described by the frequency at which the phase shift crosses 90 degrees, such as in this case 180 degrees to 0 degrees. The all pass filter 211 is used to compensate for the undesired phase shifts that arise in the system from second high pass filter network 207 and the low frequency shelving filter 209. The output of the first all pass filter is then directed to a second all pass filter 213 that operates where the phase shift crosses 90 degrees between 0 degrees and 180 degrees. The output of the first high pass filtering network 205 in the first channel and the second all pass filter 213 in the second channel are input to a summing amplifier and low pass filter 215 which acts to increase the magnitude of the summed signal to further reduce high frequency components. The output of the summing amplifier and low pass filter 215 is directed to an optional filtering network for further tailoring frequency response.

Hence, the improved vehicular microphone array system 200 utilizes both acoustic and electrical delay and summing of multiple signals to achieve better noise reduction. It will be recognized that one of the key conditions in using microphone arrays is that the preferred signals received by the microphone transducers must be identical in order to utilize linear subtraction for noise reduction. This requirement presents a real challenge in an automotive vehicle as the small enclosed space creates numerous reflections and disturbances of the sound field. In particular, when microphones are mounted on the rearview mirror in a vehicle, the shape and position of the mirror with respect to surfaces, such as the windshield, headliner, and such, results in large acoustic pressure differences across the various surfaces of the mirror. It has been found that the sound pressure difference for a sound originating toward the front of the mirror, between the front and back of a typical rearview mirror, can be in excess of 10 dB at some frequencies, which makes array processing all but useless at those frequencies. There are also large phase differences as well caused by the shape and position of the mirror in the vehicle. Thus the design has to address these acoustic realities for this approach to operate correctly.

In order for the rearview mirror to perform its primary function, the mirror includes a large flat reflective glass surface which has a large aspect ratio, such that it is wide, about one third as tall as the width, and only as deep as required to conceal any accessories such as map lights or other electronics. This specific shape causes any sound field projected at the mirror to develop a large pressure increase across the front surface for sounds having at least ¼ wavelength of the dimensions of the mirror reflective surface. When a microphone is mounted on the surfaces behind the reflective surface, the sound pressure typically drops the farther away it is located from the front of the mirror. This effect is beneficial for some frequencies, and some manufacturers have proposed mounting the microphone on or close to the front surface of the mirror. This presents difficult challenges with respect to manufacturing, especially with a directional transducer, and is often not a preferred location for a mirror mounted microphone. An embodiment of the invention addresses this shortcoming by achieving very good performance utilizing microphones mounted back from the glass surface.

Figure 3:
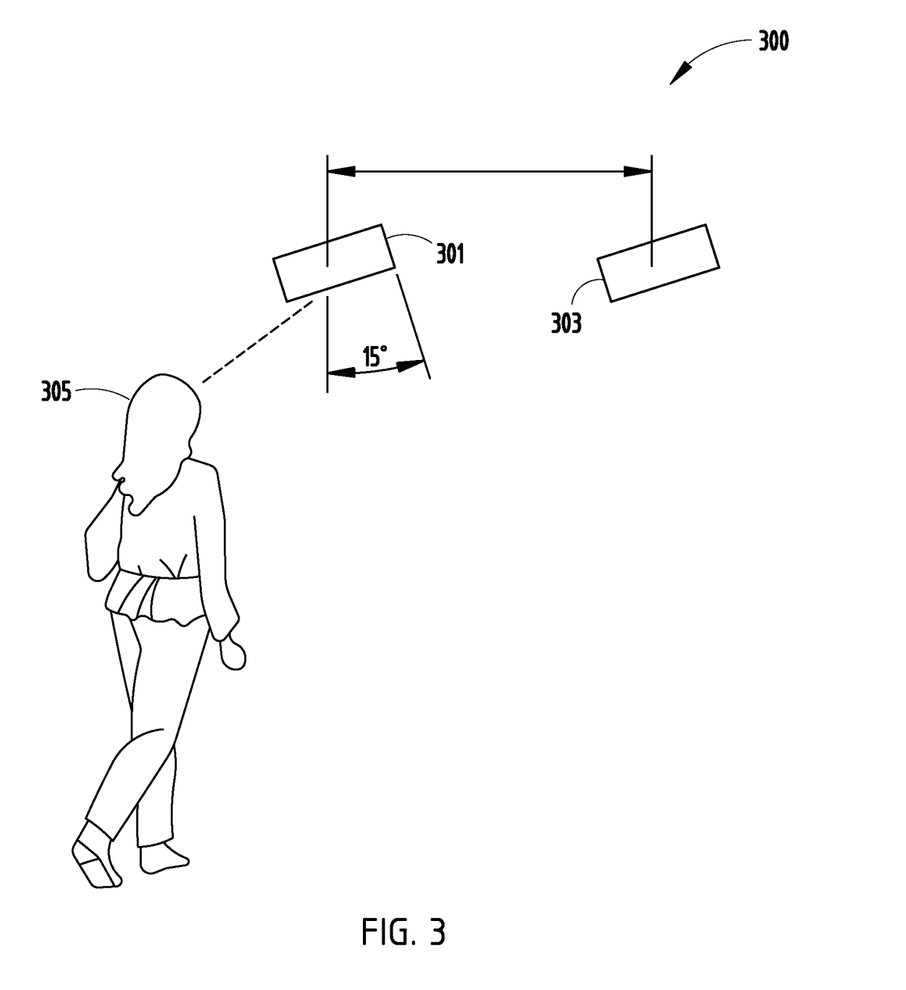
FIG. 3 is a block diagram illustrating microphone positioning of the microphone array in accordance with an embodiment of the invention.

FIG. 3 is a block diagram illustrating a multiple microphone array 300 in accordance with an embodiment of the invention. In this example, the first microphone 301 and the second microphone 303 are positioned approximately 46 mm apart with an offset of approximately 15 degrees from the driver 305. Those skilled in the art will recognize that when multiple microphones are mounted on a mirror, the microphones must be installed such that they are the same distance from the front reflective surface to have a nearly equal on-axis frequency response. Also, because of the aspect ratio of the mirror, the microphones should be positioned in relatively close proximity to have a nearly equal off-axis frequency response. This creates a tradeoff between a greater spacing's improved lower frequency performance and avoidance of secondary lobes in the higher frequencies caused by too great a spacing.

Therefore, small spacing distances lend to good high frequency directionality, while large spacing distances are required for good low frequency directionality. The spacing for the microphones is, therefore, in the range of less than 102 mm, with 50 mm being a nearly optimal value, for an automotive rearview mirror mounted microphone array. Those skilled in the art will recognize that when mounted in a typical car interior, the reflective surfaces cause an usually large drop in the on-axis frequency response of the microphone in the 800 to 1500 Hz range on the side of the mirror away from the driver. This characteristic adds an additional reason for rejecting the use of a wide spacing, such as 102 mm, since it is not desirable for a high microphone performance design.

One problem involved in reducing vehicular noise using digital signal processing (DSP) is that the frequency bands identified as having significant speech content are often below the maximum allowed magnitude. When the reconstructed signal is subsequently processed by a cellular phone or telephone network, the voice audio signal is once again broken down into frequency bands that typically are fewer than was done in the initial DSP process. Any speech in bands that is of too low a magnitude will be filtered and/or removed by this process. The result is speech components that are no longer usable or, in more serious cases, are totally missing.

Figure 4:
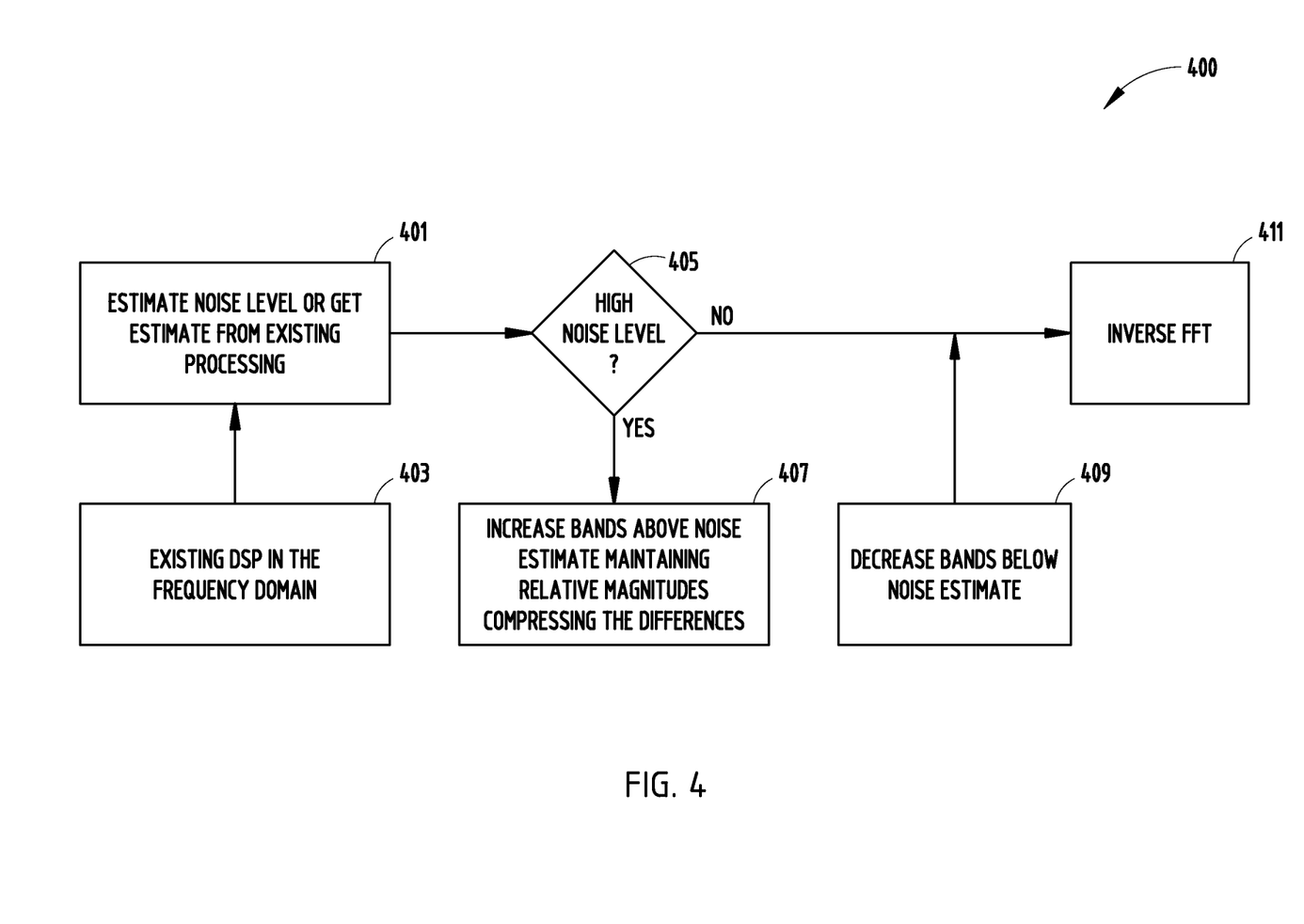
FIG. 4 is a flowchart diagram illustrating a process for post processing optimization of a microphone signal containing residual noise in accordance with an embodiment of the invention.

FIG. 4 is a flowchart diagram illustrating a process for post processing optimization of a microphone signal containing residual noise 400 in accordance with an embodiment of the invention. Initially, the process begins where the noise level is estimated 401. Most noise processing systems are capable of determining and/or using a noise estimate; therefore, the estimate may also be determined from the existing processing 403 preceding the estimating step 401. The estimated noise level is then used to determine if exceptional processing is required, i.e., the noise level is at a substantial level in order to warrant the use of additional processing 405. Since this processing will alter the normal audio characteristics, additional processing of the audio typically will not be performed unless the noise level exceeds some predetermined threshold.

If no additional processing is required, the audio in the frequency domain will be applied to an inverse FFT process 411 in order to reproduce the most natural sound of the user's voice. In the event exceptional digital signal processing (DSP) is required to avoid downstream errors, then the process operates to increase every band above the estimated noise by an amount that preserves the relative magnitudes 407. This process prevents the CODEC from eliminating any frequency band with significant speech content. This process can be performed by establishing a constant for a percentage of the difference between the actual band magnitude and the noise estimate. For example, if a 10 percent factor is desired and there is a 100 unit difference between the maximum tolerable value and the desired frequency band, this difference would be reduced to a 10 unit difference. Thus, the smaller the percentage of retention results the greater reduction in dynamic range. The lower energy bands being elevated to nearly the same magnitude as the most intense.

Those skilled in the art will further recognize that a key aspect of this process is to preserve the relative signal magnitudes to assure acceptable sounding speech. It is also possible the compression factor will vary with the noise estimate being a smaller percentage as the noise rises and greater compression is required. Subsequently, after the magnitudes of the frequency bands having the noise are increased, the frequency bands whose magnitudes are below this level are then decreased below the desired noise estimate 409. Hence, the magnitude of any frequency band below the estimate is reduced to a very low, insignificant, value 407. This has the effect of increasing the apparent signal-to-noise ratio. The noise content reference is reduced in the downstream stages when the processed audio is subjected to an inverse FFT process 411 for conversion to the time domain.

Therefore, the process described in FIG. 4 operates to raise the magnitude of all speech bands near their maximum value. When processed downstream by a subsequent cellular telephone or a telephone network, all of the speech bands will be passed as they are above some predetermined threshold magnitude. This increase in magnitude of the speech bands does not result in distorted speech, nor does clipping the bands at the maximum level result in gross distortion products. Raising the magnitude of the weaker audio bands, i.e., those less in magnitude, is generally interpreted by those listening to the call as a person raising his/her voice in high noise environment, an acceptable change in most cases.

In operation, the speech process in accordance with the present invention works to elevate specific frequency bands containing "significant" speech. This works to make all of the resulting audio though a cellular handset to be interpreted by a listener as only normal speech irrespective of this type of unique signal processing. In practice, the relative relationship between speech content frequency bands should be maintained, but merely compressed toward the maximum value which makes the resulting processed speech sound like normal audio. Ideally, the processing, as described herein, will only be performed in situations where noise is present and at a degree of processing that reflects the current noise level. No processing is performed in quiet conditions but instead only near frequency band clipping levels under conditions where the highest noise is present.

The process as described herein operates to pass noise that is elevated in magnitude by some predetermined level since it is preferred to pass a minimal amount of noise rather than to lose important speech content. An undesired "noise pumping" can be reduced by adding white noise, i.e., noise having a wide range frequency spectrum. Finally, a determination of band gain can be performed in several ways where a nonlinear gain is used to raise the weaker frequency bands substantially close to their maximum value while avoiding gross clipping of the more powerful frequency bands which will retain the relative magnitudes. Under these conditions, the voice bands having the greatest magnitude will remain the highest post audio processing, while the frequency bands of the lowest or weakest magnitude will still be weaker although the difference will be reduced. Those skilled in art will recognize that this process operates in a unique manner to mimic some processing of a complex compressor/expander.

In yet another embodiment, the threshold can be varied for expansion and/or compression (compandor). Although a conventional expandor or compressor has fixed thresholds, these bandwidths can be made adaptively dynamic for optimal performance. In effect, the magnitude of the signal that triggers the event will vary with its use condition. In quiet conditions, where both the noise and speech are relatively low, the signal magnitude required to cause expansion will be lower than in substantially high noise and higher average speech level conditions. Accordingly, this solution works to pass all speech while still rejecting a significant amount of the noise. In a fixed threshold system, the lowest speech level condition determines the threshold to assure all speech is passed. Ideally this threshold boundary will increase as both the speech amplitude and noise increase. The preferred or ideal level should be just at the boundary to assure passage of all probable speech levels.

Hence, an embodiment of the invention is directed to a multiple microphone assembly with analog processing circuitry for providing greater directivity resulting in improved signal-to-noise performance in view of a noisy environment present in automotive vehicles. As described herein, microphones mounted within the vehicle are placed parallel to one another, so as to enhance performance when mounted on a vehicle accessory such as a mirror. An embodiment of the invention works with a process to address the loss of speech due to residual noise in downstream audio processes, such as those in the cellular telephone handset and/or network systems. In addition, this approach reduces the impact of dynamic range limitations imposed by a Bluetooth remote microphone link while also addressing the impact on cellular telephone systems designed for typical headset speech signals by emulating these characteristics.

Aspects of this invention are based on at least three observations, namely, the speech frequency bands in the frequency domain can be clipped and the resulting speech remains intelligible, persons with occupations requiring public speaking in a high noise environment find that speaking using a vocal cord frequency that will offer the greatest number of frequency bands at a elevated level, and the characteristics of a cellular handset's microphone are required for proper function by some cellular networks. The persons speaking in high noise environments sound as if they are talking loud but otherwise sound normal. Taken together, the new system and methods as described herein apply gain to the speech bands or speech times raising them in amplitude near to the maximum level and reducing significantly bands or times when the speech levels are below this established value. This is in contrast to typical signal processing which leaves the speech content in processed signals as it is captured in high noise situations. These actions assure that the appropriate and/or most important voice components will not be removed by downstream audio signal processing. Although, the resultant speech does not sound completely normal, but instead sounds more like a person speaking loudly, this resulting sonic characteristic is acceptable to most cellular telephone users, further, if the relative magnitude of the speech bands is maintained, the speech sounds more natural. Although there can be a degree of noise pumping using this process, such as a variation in noise with the speech, this result is preferable to the loss of critical speech frequency components. Any noise pumping can also be reduced using the methods as described herein.

Figure 5A:
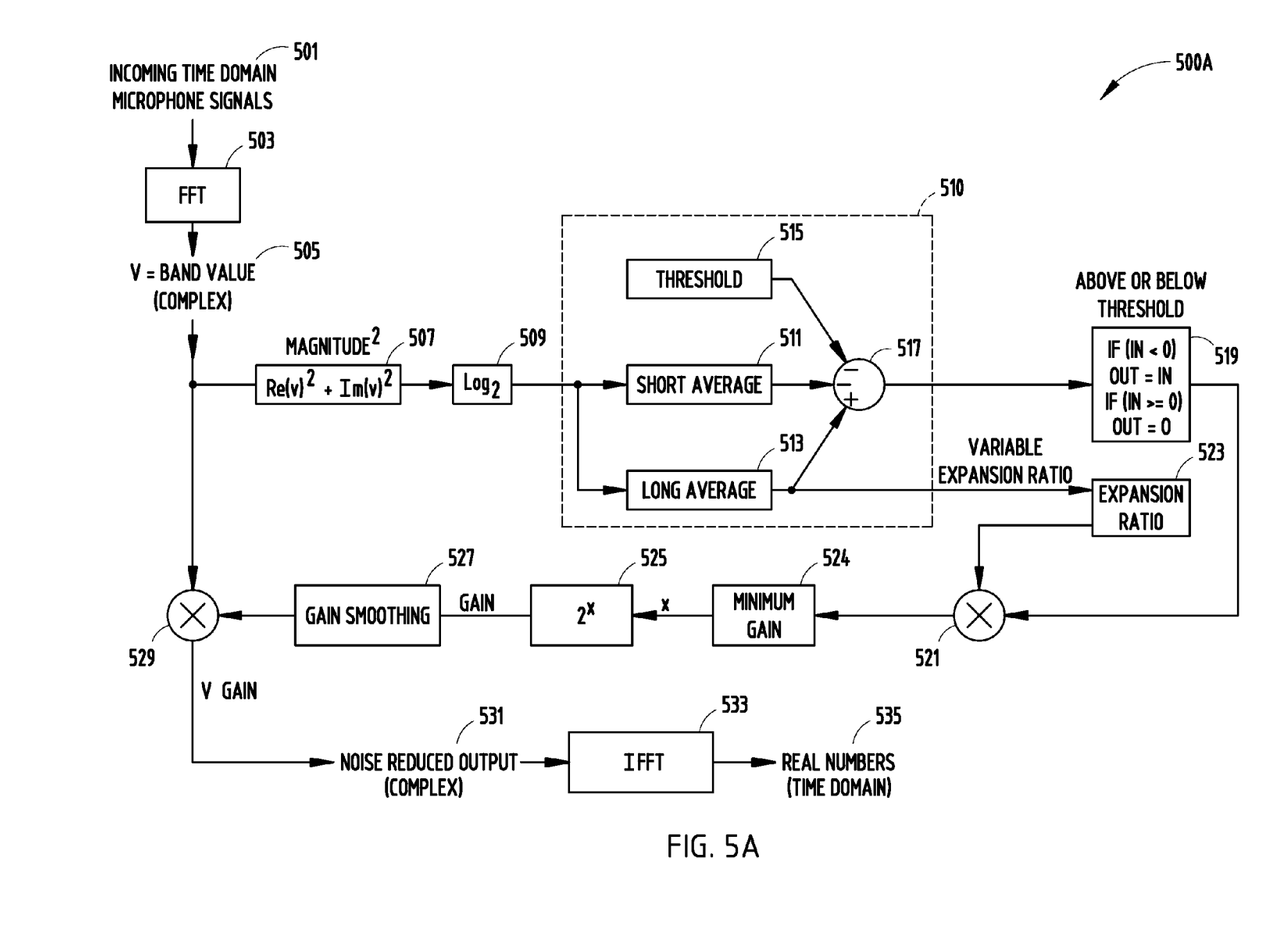
Figure 5B:
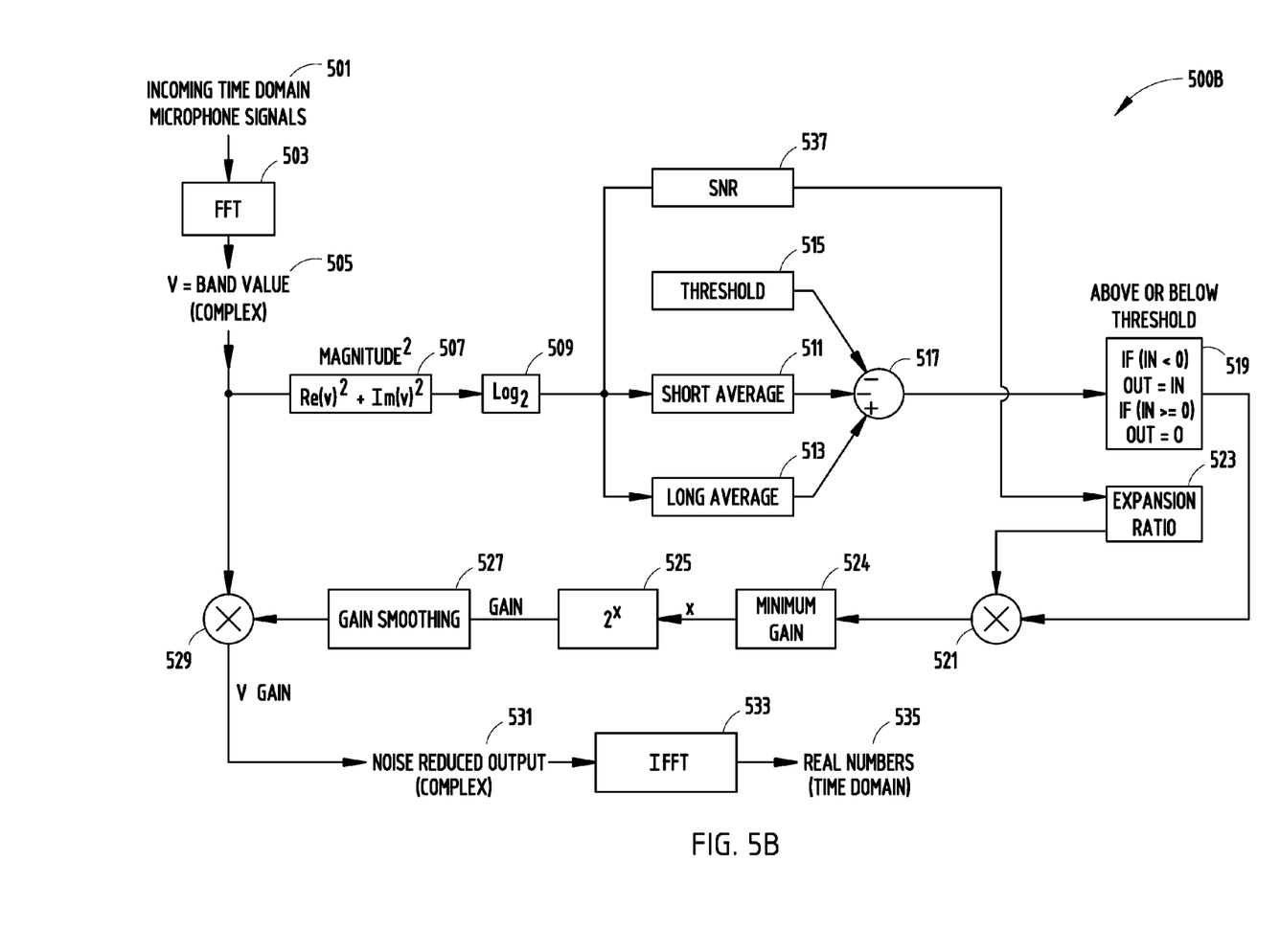
Figure 5C:
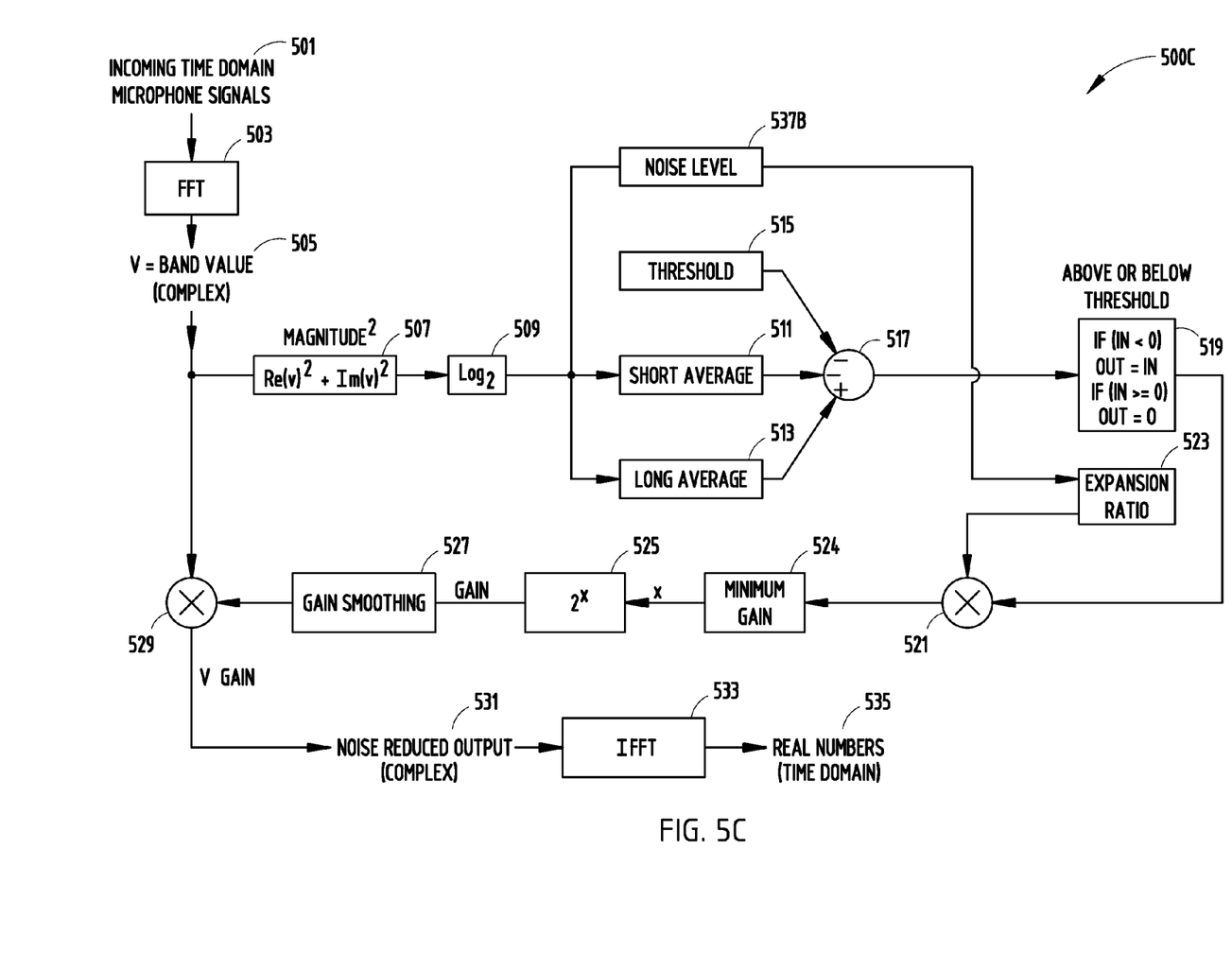

In still yet another embodiment of the invention, FIGS. 5A, 5B and 5C illustrate automatic gain control (AGC) systems using a multiband downward expander with an adaptive expansion threshold having a beamformer using an array of silicon microphones. As described herein, the AGC and expansion may also be implemented on a single directional or omnidirectional microphone for a lower cost system. The expansion and AGC algorithms may also be implemented in the DSP software of a telematics system like the General Motors Corporation's ONSTAR system or Ford Motor Company's SYNC system.

As is known in the art, stationary noise reduction algorithms (such as the Ephriam-Malah algorithm) attempt to find and remove steady state frequency components by determining the energy minima (noise floor) of each frequency band and then attenuating each band in proportion to its noise floor. Instead of this approach, another embodiment of the present invention compares both the long-term and short-term energy levels in each frequency band. When a band's short-term average falls below its long-term average by more than a threshold value, that frequency band is expanded downward by a preset or predetermined expansion ratio. As will be evident to those skilled in the art, the expansion operates as a nonlinear noise reduction system such that the downward expansion operates where a threshold is set at a level below desired audio signals, but above the noise floor. When the signal drops below the threshold, expansion is applied, pushing the audio signal even further down, reducing the level of noise. For example, an expander might be set up with a 1:6 ratio. This means that for every 1 dB of input level of change that is seen by the expander, the expander will provide a 6 dB change at its output. When an audio signal drops below the threshold by 2 dB, the output of the expander will drop by 12 dB, similarly dropping the level of any background noise floor. Any signals above the threshold are not modified. The parameters controlling the long-term average, short-term average, attack and release parameters, threshold, minimum gain and expansion ratio may all be selected as functions of frequency. When used in a vehicular application with substantially high noise levels, this allows a much better tradeoff of signal distortion vs. noise reduction than the Ephriam-Malah algorithm and other related stationary noise reduction algorithms which have a more limited number of adjustments.

As described herein a fixed or adaptive beamformer is used to generate a directional microphone pattern using two or more microphones. In many situations, four microphones work to form an optimal beamformer. The beamformer may be implemented in analog hardware or in a microprocessor. As illustrated in FIG. 5A, the downward expander system 500A utilizes incoming microphone signals 501 that are digitized and then transformed to the frequency domain using a fast Fourier transform (FFT), weighted overlap-add or filter bank 503. For this document all three methods can be considered equivalent. This produces frequency band values 505 which are complex numerical values that can be manipulated mathematically using a magnitude conversion 507 where the summed squares of both the real and imaginary portion of the frequency band values are determined Optionally, the square root of the sum of the squares may be calculated in 507. The frequency band values 505 from the FFT 503 are also provided to a gain adjustment 529.

From the magnitude conversion 507, the outputs are converted to a logarithmic value $\log_2$ 509 that is used in an energy level determination stage 510. Since the input to the $\log_2$ calculation is always less than one, the result is negative. In the system as described in this embodiment, the long-term average, short-term average and a threshold value 515 are summed by 517. Threshold logic 519 prevents the output of sum calculation 517 from exceeding zero, thereby limiting the maximum gain to one. When a frequency band's short-term average 511 falls below its long-term average 513 by more than a threshold value 515, that frequency band is expanded downward by a predetermined or variable expansion ratio 523 while signals above the threshold are not modified. This is accomplished by multiplying the output of the threshold logic 519 by the expansion ratio. The long-term average tends to track the average noise level in the vehicle. This information can optionally be used to modify the expansion ratio as a function of the long-term average.

An optional minimum gain parameter 524 may also be applied to reduce distortion by preventing gain reduction below a preset value. A $2^x$ antilog function 525 is used to convert the logarithmic gain values back into the linear domain. Optionally, gain smoothing 527 works to smooth the gain changes in time. Gain smoothing 527 may also precede the minimum gain parameter 524 or the $2^x$ antilog function 525. The linear band gain values are then multiplied at 529 by the original band values 501 to effect band gain reductions. Those skilled in the art will recognize that this technique operates similar to a 1:1 compression/expansion ratio at low levels due to the minimum gain parameter 524. The parameters controlling the long-term average 513, short-term average 511, threshold value 515, variable expansion ratio 523 and $2^x$ antilog function 525 operate as functions of the frequency band. Additionally, the short-term average 511, long-term average 513, and gain smoothing 527 can optionally use separate attack and release time constants to minimize distortion and other undesirable processing artifacts before the signal is submitted to a gain adjustment 529. After the gain modifications in the frequency domain, the signal is transformed back into the time domain using an inverse FFT or filter bank 533 where a real numerical value is provided in the time domain.

In another embodiment, FIG. 5B illustrates a downward expander 500B modified so that the energy level determination stage 510 also utilizes a signal-to-noise ratio (SNR) 537A for determining a variable expansion ratio 523 instead of using the long-term average 513 for expressing this value. One skilled in the art will recognize that the SNR is the ratio of audio signal power to the noise power corrupting the signal. In operation, the SNR compares the level of a desired signal such as a user's voice to the level of background noise in the vehicle. The higher the ratio, the less obtrusive the background noise. In the present invention, the SNR is calculated as a ratio based on the voice-to-noise components of the incoming signal from the microphone beamformer. There are many SNR calculation methods known in the art, one possible method is to track the minimum and maximum values of a short-term average. The SNR is low when the minimum and maximum values of a short-term average are similar and high when the minimum and maximum are widely separated. The minima correspond to speech pauses and the maxima correspond to speech. Similarly, FIG. 5C illustrates the downward expander system 500C shown in FIG. 5A, where a noise level determination stage 510 utilizes the ambient noise level 537B for determining a variable expansion ratio 523 instead of the long-term average 513. The ambient noise level is the background noise in an area or environment within the vehicle that is comprised of a composite of sounds from many sources near and far to the microphones. One possible ambient noise calculation method is to track the minimum value of a short-term average. In this case, the minima correspond to speech pauses and therefore also represent the ambient noise level.

Additionally, an AGC system which operates on the wideband signal can be implemented such that multiple (typically two or three) averaged energy calculations are made with different attack and release time constants. Frequency bands which tend to be dominated by noise may be excluded from or deemphasized in the wideband energy calculations. The largest output of the two or three averages is selected to control the instantaneous gain. A typical set of attack/release time constants would be: 5 ms/50 ms, 50 ms/2 s and 2 s/20 s. The short 5 ms/50 ms time constant can provide short-term gain reduction for a transient noise event such as hitting a pothole without substantially affecting the longer term gain. The long 2 s/20 s time constant can provide volume leveling that is substantially unaffected by transient events. It will be further recognized that multiband downward expansion can be performed before or after conventional stationary noise reduction. As this processing works on different principles than standard stationary noise reduction, the improvement can be additive. Stationary noise reduction followed by expansion may be preferred as the expansion process tends to make any residual noise appear as non-stationary.

Thus, the present invention overcomes the shortcomings of prior art stationary noise reduction algorithms to optimize voice signals in a vehicular environment by removing steady state frequency components of incoming voice signals. An embodiment of the present invention works by comparing both a long-term and short-term energy levels in each of a plurality of frequency bands such that when a frequency band's short-term average falls below its long-term average by more than a threshold value, that frequency band is expanded downward by a preset or predetermined expansion ratio. As noted herein, when used in vehicles having a substantially high noise level, an optimization of signal distortion compared to noise reduction is achieved in view of the greater variation amongst adjustments that can be made using this type of noise reduction system.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method for processing voice signals in a vehicular microphone system comprising the steps of:
   comparing a plurality of noise component values for at least one frequency band of plurality of frequency bands; and
   downwardly expanding the at least one frequency band by a predetermined expansion ratio for providing a noise reduced signal when determining a value is below a predetermined threshold; and
   providing the noise reduced signal to an electronic device, wherein the noise component values are from the group of: a short-term energy level average, a long-term energy level average, a signal-to-noise (SNR) ratio of the signal and an ambient noise level received by the microphone system.

2. A method for processing signals as in claim 1, wherein the step of downwardly expanding further comprises the step of:
   providing downward expansion of the frequency band when a short-term energy level average falls below a long-term energy average by the predetermined threshold.

3. A method for processing signals as in claim 1, further comprising the step of:
   processing analog data from a beamformer microphone into a complex numerical value over the at least one frequency band using a filter bank.

4. A method for processing signals as in claim 1, further comprising the step of:
   adding the square of both a real and imaginary portion of the complex numerical value for the at least one frequency band to produce a magnitude value; and
   calculating a logarithmic value from the magnitude value.

5. A method for processing signals as in claim 3, wherein the step of calculating includes the step of:
   determining the log value from the magnitude value.

6. A method for processing voice signal as in claim 1, further comprising the steps of:
   calculating a linear gain value for the noisy signal;
   smoothing the linear gain value of the noise reduced signal to provide a normalized signal; and
   processing the normalized signal using an inverse filter bank to provide an analog noise reduced signal in the time domain.

7. A method for processing signals as in claim 6, wherein the step of calculating a linear value includes the step of:
   determining the antilog value of the noise reduced signal.

8. A method for processing voice signals in a vehicular microphone system comprising the steps of:
   converting the voice signals into a plurality of frequency bands in the frequency domain;
   comparing a long-term and short-term energy level from each frequency band;
   calculating a long-term average and short-term average from each respective short-term energy level and long-term energy level;
   comparing the short-term average to the long-term average;
   expanding the frequency band in a downward manner by a predetermined expansion ratio when the short-term average falls below the long-term average by a threshold value;
   converting the downwardly expanded signal into the time domain; and
   providing a noise reduced signal to an electronic device based on the expanded frequency band.

9. A method for processing voice signals as in claim 8, wherein the step of converting voice signal comprises the steps of:
   processing the voice signals from a beamformer microphone into a complex numerical value over a plurality of frequency bands using a filter bank;
   adding the square of both a real and imaginary portion of the complex value for each one of the plurality of frequency bands to produce a magnitude squared value; and
   calculating a logarithmic value from the magnitude value to determine an energy level.

10. A method for processing voice signals as in claim 8 further comprising the step of:
    calculating a linear value for the noise reduced signal.

11. A method for processing voice signals as in claim 10, further comprising the step of:
    gain smoothing the linear value of the noise reduced signal to provide a normalized signal.

12. A method for processing voice signals as in claim 11, further comprising the step of:
    processing the normalized signal using an inverse filter bank to provide an analog noise reduced signal in the time domain.

13. A method for processing voice signals as in claim 8, further comprising the step of:
    calculating a signal-to-noise ratio (SNR) of the logarithmic value; and
    utilizing the SNR to determine the predetermined expansion ratio.

14. A method for processing voice signals as in claim 8, further comprising the step of:
    determining the amount of noise present with voice signals; and
    using the noise to determine the predetermined expansion ratio.

15. A method for processing voice signals as in claim 8, wherein the electronic device is at least one from the group of: a cellular telephone, a global positioning system or a vehicular telematics system.

16. A method for providing an enhanced voice signal in a vehicular microphone system comprising the steps of:
  processing analog data from a beamformer microphone into a complex numerical value over at least one of a plurality of frequency bands using a filter bank;
  summing the square of both a real and imaginary portion of the complex value for each one of the plurality of frequency bands to produce a magnitude value;
  calculating a logarithmic value from the magnitude squared value;
  comparing a long-term and short-term energy levels from each frequency band;
  calculating short-term average from the short-term energy level;
  calculating a long-term average from the long-term energy level;
  comparing the short-term average to the long-term average;
  calculating a signal-to-noise ratio (SNR) of the logarithmic value;
  utilizing the SNR to determine a predetermine expansion ratio;
  expanding the frequency band in a downward manner by the predetermined expansion ratio when the short-term average falls below the long-term average by a threshold value;
  calculating a linear value for the noise reduced signal;
  gain smoothing the linear value of the noise reduced signal to provide a normalized signal;
  processing the normalized signal using an inverse filter bank for providing an analog noise reduced signal from the frequency domain into the time domain; and
  providing a noise reduced signal based on the expanded frequency band.

17. A method for providing an enhanced voice signal as in claim 16, further comprising the step of:
  providing the noise reduced signal to an electronic device.

18. A method for providing an enhanced voice signal as in claim 16, further comprising the step of:
  providing the noise reduced signal to at least one from the group of: cellular telephone or vehicular telematics device.

19. A method for processing voice signals as in claim 1, further comprising the step:
  providing the noise reduced signal to electronic device.

20. A vehicular microphone system configured for processing signals, the system comprising:
  a processor configured to:
    compare a plurality of noise component values for at least one frequency band of a plurality of frequency bands; and
    downwardly expand the at least one frequency band by a predetermined expansion ratio for providing a noise reduced signal when determining a value is below a predetermined threshold;
  wherein the noise component values are selected from the group of:
    a short-term energy level average;
    a long-term energy level average;
    a signal-to-noise (SNR) ratio of the signal; and
    an ambient noise level received by the microphone system.

21. A vehicular microphone system as in claim 20, wherein downwardly expand of the at least one frequency band comprises:
  providing downward expansion of the frequency band when a short-term energy level average falls below a long-term energy average by the predetermined threshold.

22. A vehicular microphone system as in claim 20, wherein the processor is further configured to:
  process analog data from a beamformer microphone into a complex numerical value over the at least one frequency band using a filter bank.

23. A vehicular microphone system as in claim 20, wherein the processor is further configured to:
  add the square of both a real and imaginary portion of the complex numerical value for the at least one frequency band to produce a magnitude value; and
  calculate a logarithmic value from the magnitude value.

24. A vehicular microphone system as in claim 23, wherein calculation of a logarithmic values comprise:
  determining the log value from the magnitude value.

25. A vehicular microphone system as in claim 20, wherein the processor is further configured to:
  calculate a linear gain value for the noisy signal;
  smooth the linear gain value of the noise reduced signal to provide a normalized signal; and
  process the normalized signal using an inverse filter bank to provide an analog noise reduced signal in the time domain.

26. A vehicular microphone system as in claim 25, wherein calculation of a linear value comprises:
  determining the antilog value of the noise reduced signal.

* * * * *

UNITED STATES PATENT AND TRADEMARK OFFICE
CERTIFICATE OF CORRECTION

PATENT NO. : 8,416,964 B2  
APPLICATION NO. : 12/570615  
DATED : April 9, 2013  
INVENTOR(S) : Michael A. Bryson et al.

Page 1 of 1

It is certified that error appears in the above-identified patent and that said Letters Patent is hereby corrected as shown below:

In the Specification

Col. 4, line 47;

"summer The" should be -- summer. The --,

Col. 8, line 13;

"obser-vations" should be -- observations --,

Col. 8, line 15;

"intel-ligible" should be -- intelligible --,

Col. 9, line 33;

"determined Optionally" should be -- determined. Optionally --,

In the Claims

Col. 11, line 38, Claim 1;

Delete "providing the noise reduced signal to an electronic device".

Signed and Sealed this
Nineteenth Day of August, 2014

Michelle K. Lee
*Deputy Director of the United States Patent and Trademark Office*